(12) United States Patent
Osaku et al.

(10) Patent No.: US 8,522,535 B2
(45) Date of Patent: *Sep. 3, 2013

(54) BREATHER DEVICE, LIQUID TANK, AND EXHAUST GAS PURIFYING APPARATUS TO BE ADAPTED FOR ENGINE

(75) Inventors: Yasushi Osaku, Ageo (JP); Kiyoshi Fukuda, Ageo (JP)

(73) Assignee: Nissan Diesel Motor Co., Ltd., Saitama (JP)

( * ) Notice: Subject to any disclaimer, the term of this patent is extended or adjusted under 35 U.S.C. 154(b) by 196 days.

This patent is subject to a terminal disclaimer.

(21) Appl. No.: 13/102,996

(22) Filed: May 6, 2011

(65) Prior Publication Data

US 2011/0209464 A1     Sep. 1, 2011

Related U.S. Application Data

(63) Continuation of application No. 12/240,843, filed on Sep. 29, 2008, now Pat. No. 7,958,905, which is a continuation of application No. PCT/JP2007/052679, filed on Feb. 15, 2007.

(30) Foreign Application Priority Data

Mar. 31, 2006 (JP) ................................. 2006-098568

(51) Int. Cl.
*F01N 3/00* (2006.01)
(52) U.S. Cl.
USPC .................. 60/295; 60/283; 60/286; 60/303; 222/478; 222/482; 137/43; 137/588; 137/840

(58) Field of Classification Search
USPC .................. 60/283, 286, 295, 303; 222/478, 222/482; 137/43, 587, 588, 840
See application file for complete search history.

(56) References Cited

U.S. PATENT DOCUMENTS

| 1,724,878 | A | | 8/1929 | Jensen |
|---|---|---|---|---|
| 3,500,843 | A | | 3/1970 | White |
| 3,747,800 | A | * | 7/1973 | Viland ........................... 220/723 |
| 3,800,768 | A | * | 4/1974 | Rhodes et al. ................. 123/522 |
| 6,014,858 | A | * | 1/2000 | Zankowski ...................... 60/274 |
| 7,210,471 | B2 | * | 5/2007 | Ikeda et a ..................... 123/572 |
| 7,320,769 | B2 | | 1/2008 | Aoki et al. |
| 7,544,328 | B2 | * | 6/2009 | Osaku et al. .................. 422/527 |
| 7,958,905 | B2 | * | 6/2011 | Osaku et al. ..................... 137/43 |
| 8,250,857 | B2 | * | 8/2012 | Driscoll et al. ................. 60/286 |
| 2002/0121517 | A1 | | 9/2002 | Aoki et al. |
| 2003/0200743 | A1 | | 10/2003 | Berriman et al. |
| 2006/0248880 | A1 | | 11/2006 | Hirata et al. |

FOREIGN PATENT DOCUMENTS

| JP | 6-227270 | 8/1994 |
|---|---|---|
| JP | 3038173 | 3/1997 |
| JP | 2000-027627 | 1/2000 |
| JP | 2002-137643 | 5/2002 |

(Continued)

*Primary Examiner* — Binh Q Tran
(74) *Attorney, Agent, or Firm* — McDermott Will & Emery LLP

(57) ABSTRACT

A breather device A1 for pressure relief includes a breather pipe 121 serving as a fixing part, and an inner pipe 122 serving as a communication part and is provided by the breather pipe 121 with fixation strength enough for securing the breather device A1 to a liquid tank 101. The inner pipe 122 has a vent hole P formed therein for provide fluid-communication between the inside of the liquid tank 101 and the outside thereof in a manner such that an inner surface forming the vent hole P is made of a resin.

4 Claims, 8 Drawing Sheets

(56) References Cited

FOREIGN PATENT DOCUMENTS

| | | |
|---|---|---|
| JP | 2002-254938 | 9/2002 |
| JP | 2003-314252 | 11/2003 |
| JP | 2005-105969 | 4/2005 |

* cited by examiner

BREATHER DEVICE, LIQUID TANK, AND EXHAUST GAS PURIFYING APPARATUS TO BE ADAPTED FOR ENGINE

This application is a continuation of U.S. patent application Ser. No. 12/240,843, filed on Sep. 29, 2008, which is a continuation of PCT/JP2007/052679, filed on Feb. 15, 2007, both of which are hereby incorporated by reference in their entirety for all purposes.

BACKGROUND OF THE INVENTION

1. Field of the Invention

The present invention relates to a breather device, a liquid tank, and an exhaust gas purifying apparatus that is adapted for purifying exhaust gas from an engine. In particular, the present invention relates to a technology for enabling it to prevent urea precipitation inside a breather device provided for a liquid tank in which urea aqueous solution is stored.

2. Description of the Related Art

As a technology that has been developed for purifying nitrogen oxides (hereunder, referred to as NOx) exhausted from a diesel engine, by using after treatment, the urea SCR (Selective Catalytic Reduction) is known. This urea SCR adds ammonia to exhaust gas, and with this ammonia as a reducing agent, reduces and purifies the NOx. In order to accelerate the NOx reduction, a reducing catalytic converter is disposed in the exhaust gas passage. In consideration of storage convenience, urea serving as an ammonia precursor, is stored in a tank in an aqueous solution state, and in actual operation, the urea aqueous solution is supplied from this tank and injected into the exhaust gas passage upstream of the reducing catalytic converter (Japanese Laid-open (Kokai) Patent Application Publication No. 2000-027627, Paragraph No. 0013). The technology using this urea SCR is applied to exhaust gas purification in a diesel engine mounted on a large vehicle such as truck, and is being put to practical use.

Here, in the tank for storing the urea aqueous solution, in addition to a supply pipe for supplying the stored urea aqueous solution to a feed pump, there is provided a breather pipe for relieving pressure inside the tank. By introducing atmospheric air through this breather pipe when supplying the urea aqueous solution, the pressure inside the tank can be kept constant.

However, in this tank having the breather pipe, there is a problem in that if the tank vibrates due to vibrations transmitted from the engine, or traveling on a corrugated road or the like, and sloshing occurs in the stored urea aqueous solution, so that the urea aqueous solution flows along the inner wall of the tank, or splashes, and consequently attaches to the breather pipe. If the attached urea aqueous solution is left attached, this urea aqueous solution dries out due to contact with air from outside, causing precipitation of the urea, and with further repeated attachment and precipitation, the precipitated urea is accumulated, to thereby partially or completely clog the breather pipe interior. It may be considered to attach a cover provided with a vent hole in the vicinity of an opening of the breather pipe, to prevent attachment of the urea aqueous solution to the breather pipe. However, in spite of provision of the cover, if the urea aqueous solution were actually attached to the breather pipe, precipitation of urea from this urea aqueous solution could not be avoided. Moreover, when, for example, stainless steel is adopted for the material of the breather pipe owing to the necessity to have sufficient endurance with respect to the urea aqueous solution, the attached urea aqueous solution to the breather pipe flows along the seam welded part thereof that is formed when joining the stainless steel material in a cylindrical shape by the conventional induction welding, so that the urea aqueous solution is concentrated at the end of the seam welded part, with the result that blockage caused by precipitation is promoted. This is not limited to a tank for storing urea aqueous solution, but also in a liquid tank in general, if liquid attached to the breather pipe is left attached, smooth introduction of atmospheric air through the breather pipe is obstructed.

SUMMARY OF THE INVENTION

For the above reasons, in a breather device for pressure relief provided in a liquid tank, it is preferable to return the attached liquid smoothly into the liquid tank to avoid adverse effects caused by this liquid being left attached.

The present invention provides a breather device, a liquid tank, and an exhaust gas purifying apparatus for an engine that addresses the above-described problems.

The breather device of a liquid tank according to the present invention is a breather device provided in a liquid tank for pressure relief. The breather device includes a fixing part that provides fixation strength of the breather device to a liquid tank; and a communication part joined to the fixing part. The communication part forms a vent hole of the breather device for communication between the liquid tank interior and the outside, and in the communication part, an inner surface of the vent hole is formed from a resin.

The liquid tank according to the present invention includes a tank main body that forms a liquid storage part, and the aforementioned breather device attached to the tank main body.

Moreover, the exhaust gas purifying apparatus for an engine according to the present invention includes a liquid tank provided with the aforementioned breather device, and adds an aqueous solution of ammonia or its precursor stored in the liquid tank to exhaust gas upstream of a reducing catalytic converter provided in an exhaust gas passage.

According to the present invention, in the communication part of the breather device, the inner surface of the vent hole is formed from a resin. As a result even if sloshing occurs in the liquid inside the liquid tank due to vibrations or the like, and the liquid becomes attached to the breather device, the liquid can be smoothly returned into the liquid tank. Therefore, when a urea aqueous solution is stored in the liquid tank, precipitation of urea due to urea aqueous solution attached to the breather device being left attached can be avoided, and the intrinsic pressure-relief function of the breather device can be favorably maintained. Furthermore, in a liquid tank in general, since the liquid attached to the breather device can be smoothly returned into the liquid tank, interference with the smooth introduction of atmospheric air through the breather device can be avoided.

Other objects and features of the present invention can be understood from the following description, with reference to the appended drawings.

The entire contents of Japanese Patent Application No. 2006-098568, a priority of which is claimed, are incorporated as a part of the present application herein by reference.

DESCRIPTION OF THE PREFERRED EMBODIMENTS

Hereunder, is a description of embodiments of the present invention, with reference to the accompanying drawings.

Figure 1:
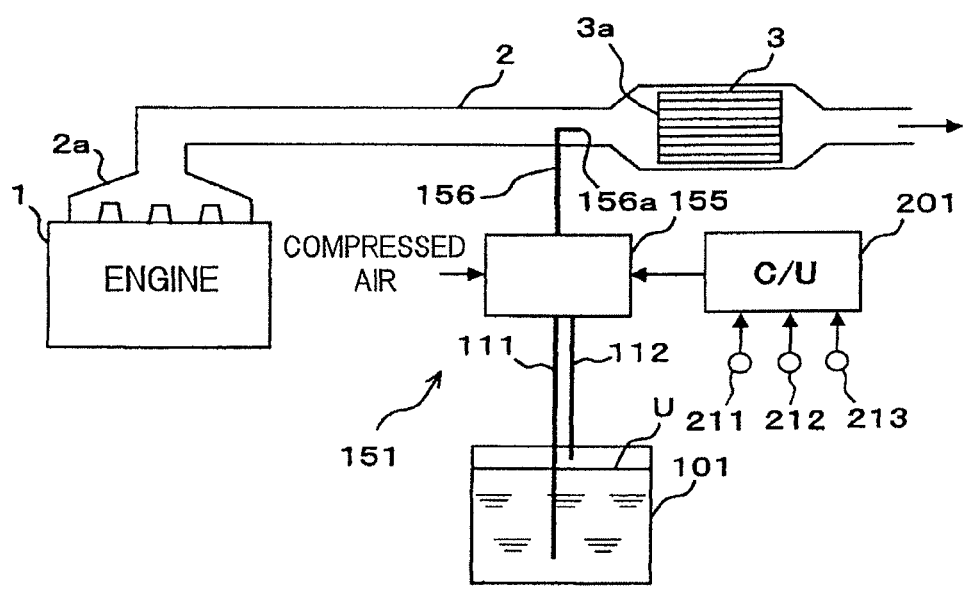
FIG. 1 is a schematic view illustrating a configuration of an exhaust gas purifying apparatus for an engine, according to a first embodiment of the present invention.

FIG. 1 shows a configuration of an exhaust gas purifying apparatus for an engine 1, according to a first embodiment of the present invention. The engine 1 according to the present embodiment is a diesel engine, and constitutes a driving source of a vehicle (here, a large vehicle such as truck). In the present embodiment, a reducing agent to be added to the exhaust gas from the engine 1 is stored in a liquid tank 101. For pressure relief, this liquid tank 101 is provided with a "breather device" according to the present embodiment. Moreover, in the present embodiment, ammonia is adopted as a NOx reducing agent. However, in consideration of simplifying use on a vehicle, a urea aqueous solution is stored in the liquid tank 101. This urea aqueous solution is one where urea serving as an ammonia precursor, is previously made into an aqueous solution.

In an exhaust gas passage 2 of the engine 1, on the downstream side of a manifold part 2a, a reducing catalytic converter 3 is disposed. The NOx in the exhaust gas is reduced and purified over this reducing catalytic converter 3, and is then discharged into atmosphere. On the upstream side of the reducing catalytic converter 3, there is disposed a urea aqueous solution injecting device (corresponding to an "addition device" according to the present embodiment) 151. When the engine 1 operates, the injecting device 151 injects urea aqueous solution into the exhaust gas passage 2. Urea in the injected urea aqueous solution is hydrolyzed to readily generate ammonia serving as a reducing agent by exhaust heat. The generated ammonia efficiently reduces NOx over the reducing catalytic converter 3, thereby converting it into harmless gas.

The urea aqueous solution is stored in the liquid tank 101, and during actual operation of the engine, it is pressure-supplied by a feed pump (not shown in the drawing) from the liquid tank 101 into the injecting device 151. The injecting device 151 is connected via a urea aqueous solution supply pipe 111 to the liquid tank 101, and the urea aqueous solution is pressure-fed via this supply pipe 111 to the injecting device 151. The injecting device 151 is provided with; a main body 155 that mixes the urea aqueous solution supplied from the liquid tank 101 with assisting air: and an injection nozzle 156 attached at its base end side to the main body 155 and with its tip end side inserted into the exhaust gas passage 2. A tip end 156a of the injection nozzle 156 is arranged so as to face an end face 3a of the reducing catalytic converter 3 on the upstream side. The injecting device 151 is connected to the liquid tank 101 via not only the supply pipe 111 but also a return pipe 112. Surplus urea aqueous solution supplied to the injecting device 151 other than that injected into the exhaust gas by the injection nozzle 156, is returned to the liquid tank 101 via the return pipe 112. In the injecting device 151, assisting air is supplied in a compressed state from an air tank (not shown in the drawing) to the main body 155. The amount of the urea aqueous solution injected by the injecting device 151 is controlled by a control unit 201, according to the operating state and so forth of the engine 1. In the present embodiment, for detecting the operating state, there are provided: an accelerator sensor 211 that detects an amount of operation of the accelerator pedal by a driver; a crank angle sensor 212 that detects a rotation angle of the crank shaft; and a temperature sensor 213 that detects the temperature of engine coolant, and the like. The engine rotation speed can be calculated based on the output from the crank angle sensor 212.

Figure 2:
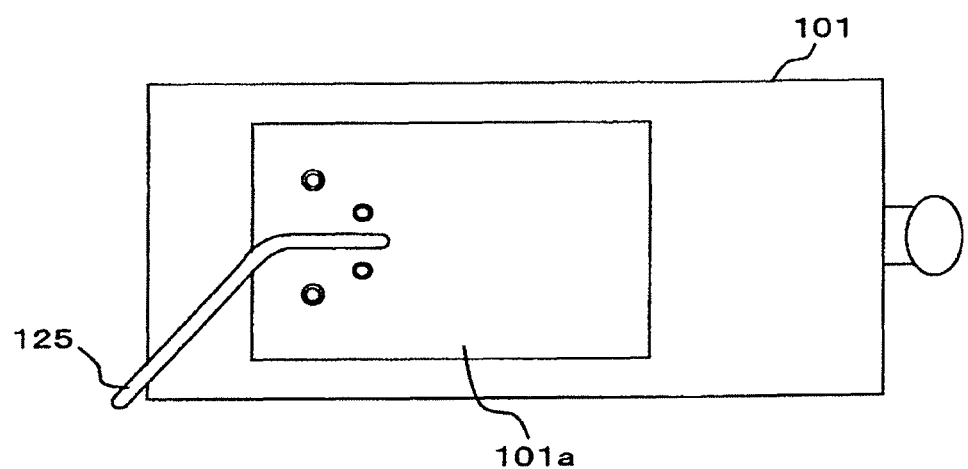
FIG. 2 is a plan view of a liquid tank according to the above embodiment.
Figure 3:
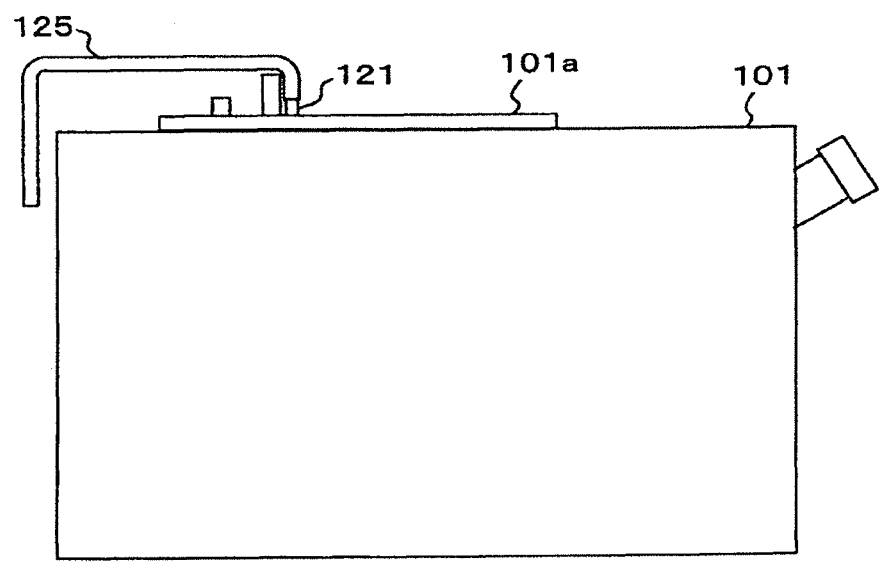
FIG. 3 is a side view of the liquid tank.
Figure 4:
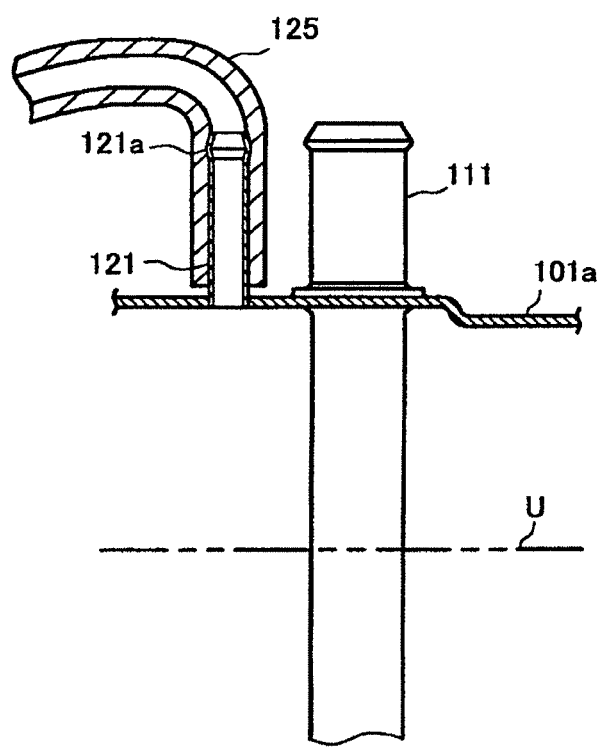
FIG. 4 is an enlarged sectional view of a lid part of the liquid tank.

FIG. 2 is a plan view of the liquid tank 101 according to the present embodiment, and FIG. 3 is a side view of the liquid tank 101. FIG. 4 is an enlarged sectional view showing a configuration of a lid part 101a of the liquid tank 101. Hereunder is a description of a configuration of a breather pipe 121 according to FIG. 4, with appropriate reference to FIG. 2 and FIG. 3. The breather pipe 121 constitutes a "fixing part". An inner pipe 122 serving as a "communication part" having a fluid-communication passage therein is inserted thereinto as described later, to constitute the "breather device" according to the present embodiment.

The liquid tank 101 is provided with the breather pipe 121. The breather pipe 121, at the base end side, vertically passes through the lid part 101a of the liquid tank 101, and is fixed to the lid part 101a. Fixing the breather pipe 121 to the lid part 101a is achieved, for example, by press-fitting. In the present embodiment, in consideration of endurance with respect to the urea aqueous solution, the breather pipe 121 is made by forming a thin plate of stainless steel material into a cylindrical shape and joining. On one end portion of the breather pipe 121 farthest from the lid part 101a, there is provided a bulging part 121a that is expanded outward in the radial direction. A rubber breather hose 125 is connected to the breather pipe 121, and when the engine 1 operates, atmospheric air is introduced via the breather hose 125 and the breather pipe 121, so that the pressure inside the liquid tank 101 is relieved. The breather hose 125 is to prevent the ingress of foreign matter from outside the liquid tank 101. The breather hose 125 extends along the top face of the lid part 101a to the side of the liquid tank 101, and its end faces downward in the vertical direction (FIG. 3). The liquid tank 101 is fixed on the vehicle frame by a bracket or the like. In the drawing (FIG. 4), the two-dot chain line U denotes a fluid level of the urea aqueous solution. The supply pipe 111 extends within the liquid tank 101 to the vicinity of the bottom, while the breather pipe 121 terminates above the fluid level U, in the vicinity of the underside of the lid part 101a.

Figure 5:
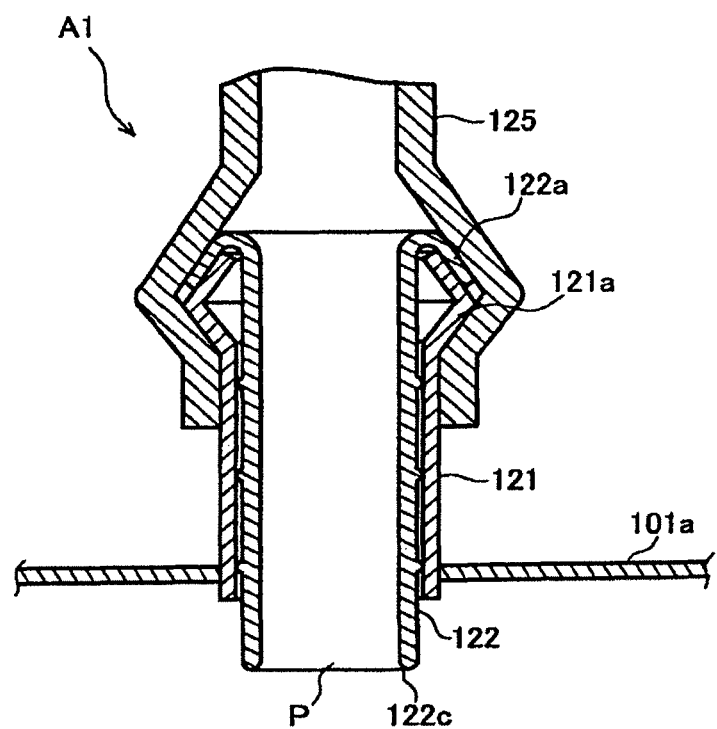
FIG. 5 is a cross-sectional view illustrating a configuration of a breather device according to the above embodiment of the present invention.
Figure 6:
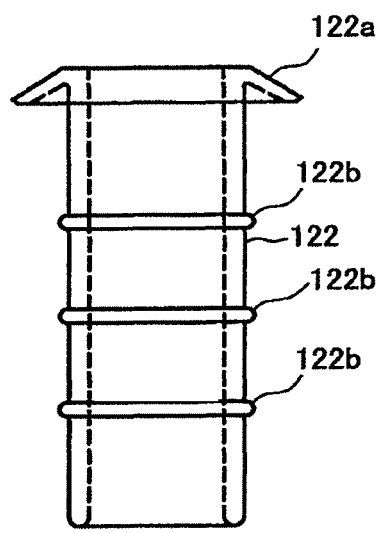
FIG. 6 is a schematic front elevation view illustrating an inner pipe that serves as a communication part of the breather device.

FIG. 5 is a sectional view including the central axis of the breather pipe 121, to show a configuration of a breather device A1 according to the present embodiment, and FIG. 6 is a side view to show the inner pipe 122 serving as the "communication part" of the breather device A1.

The breather device A1 is configured such that the inner pipe 122 serving as the "communication part" is inserted into the breather pipe 121 serving as the "fixing part". The breather pipe 121 is made of stainless steel as mentioned above, and for example, is press-fitted into the lid part 101a of the liquid tank 101 so as to provide a certain extent of fixation strength enough for securing the breather device A1 to a predesigned position in the liquid tank 101. The inner pipe 122 is made of a resin, and is formed in a cylindrical shape, with an outer diameter slightly smaller than the inner diameter of the breather pipe 121, and it has a urea aqueous solution repellent property. This repellent property may be an intrinsic property of the resin material. However, from a view point of preventing attachment of the urea aqueous solution, it is preferable that the repellent property is specially given by applying a repellent material coating. The inner pipe 122 is inserted concentric with the breather pipe 121, so that a vent hole P of the liquid tank 101 is formed of the breather device A1. The interior of the liquid tank 101 communicates with the outside via the vent hole P. As shown in FIG. 6, a brim part 122a in the shape of a bend is formed on the tip end (top end in FIG. 6) of the inner pipe 122, and this brim part 122a is engaged with the bulging part 121a of the breather pipe 121, to thereby position the inner pipe 122 with respect to the breather pipe 121. On the outer periphery of the inner pipe 122, there is provided a plurality of projecting parts 122b spaced apart in the axial direction. These projecting parts 122b are tightly engaged with the inner surface of the breather pipe 121 to thereby fix the inner pipe 122 to the breather pipe 121 with appropriate strength. Moreover, tightly engaging of the projecting parts 122b blocks the flow of the urea aqueous solution through the gap between the breather pipe 121 and the inner pipe 122, thereby preventing leakage of the urea aqueous solution from the liquid tank 101. The breather hose 125 is connected so as to cover the bulging part 121a of the breather pipe 121 and the brim part 122a of the inner pipe 122. With the inner pipe 122 inserted into the breather pipe 121, a base end 122c projects from the breather pipe 121 and extends into the liquid tank 101.

As described above, according to the present embodiment, the resin made inner pipe 122 is inserted into the breather pipe 121 to thereby constitute the breather device A1. By forming inner surface of the breather device A1 that forms the vent hole P from a resin, the inner surface of the vent hole P (that is, the inner surface of the inner pipe 122) is formed smooth with an appropriate repellent property. Therefore, even if sloshing occurs in the urea aqueous solution in the liquid tank 101 due to vibrations or the like during traveling, and the urea aqueous solution becomes attached to the breather device A1, it is possible to easily drop off the attached urea aqueous solution from the breather device A1 by the action of the vibrations or gravity, and return it into the liquid tank 101. Therefore, it is possible to avoid urea precipitation due to the urea aqueous solution being left attached to the breather device A1, and ensure a substantial sectional area of the vent hole P, and maintain the intrinsic pressure relief function of the breather device A1.

As described above, the resin-coated inner surface of the vent hole P is formed by inserting a pipe member such as inner pipe 122, but the resin-coated inner surface may also be formed by coating the inner surface of the breather pipe 121 with a resin.

Hereunder is description of other embodiments of the present invention. Components or parts that correspond to those in the first embodiment are denoted by the same reference symbols as those in FIG. 5 and FIG. 6. Also with each of the embodiments described below, an effect is obtained where urea aqueous solution attached to breather devices A2 and A3 is dropped into the liquid tank 101 by the action of gravity or the like, and urea precipitation is prevented.

Figure 7:
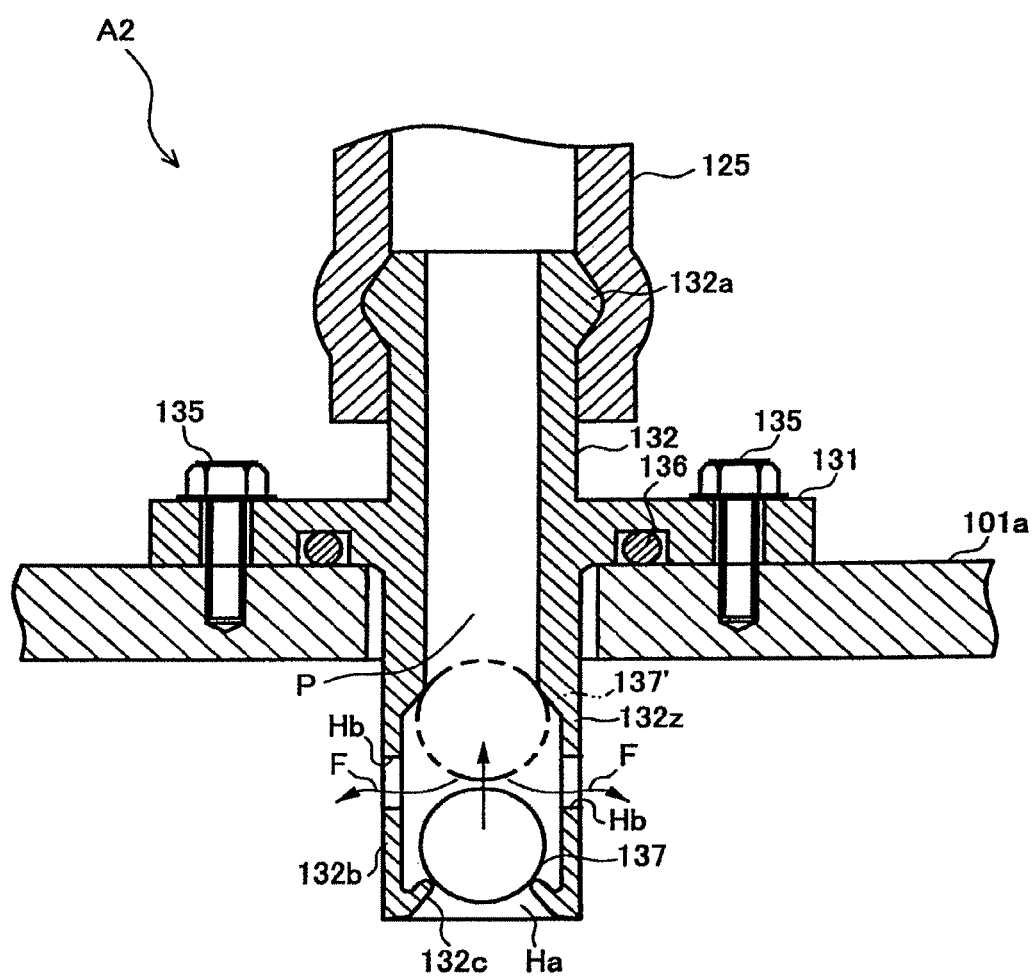
FIG. 7 is a cross-sectional view illustrating a configuration of a breather device according to a second embodiment of the present invention.

FIG. 7 is a sectional view showing a configuration of a breather device A2 according to a second embodiment of the present invention.

In the breather device A2 according to the present embodiment, the entire device is formed from a resin. That is to say, in this breather device A2, the "communication part" is constituted by a cylindrical resin pipe 132, and the "fixing part" integral with the communication part is configured with this resin pipe 132 as a flange part 131 expanded outward in the radial direction from the outer periphery thereof. The flange part 131 is fastened to the lid part 101a of the liquid tank 101 by inserting bolts 135 into each of a plurality of bolt holes provided spaced apart around the circumferential direction. Between the flange part 131 and the liquid tank 101 there is interposed a rubber O-ring 136 for ensuring air tightness of the liquid tank 101. The resin pipe 132 passes through the lid part 101a of the liquid tank 101 in the vertical direction, and projects into the liquid tank 101. In a projecting part 132b of the resin pipe 132 there is provided a "movable closing member" according to the present embodiment. That is to say, in the resin pipe 132, a through-hole Ha is formed so as to pass completely through in the axial direction, and in the projecting part 132b, the diameter of the through hole Ha expands (a portion 132z with this expanded diameter corresponds to the "accommodating part" of the movable body described later). On the tip end of the projecting part 132b there is provided a sectional hook shaped engaging part 132c that projects inward towards the central axis of the through hole Ha. The engaging part 132c holds, within the projecting part 132b, a movable body 137 serving as a "movable closing member". In the present embodiment, this movable body 137 is made from a resin sphere, and within the projecting part 132b, it is freely movable in the axial direction inside the through-hole Ha of the resin pipe 132. A plurality of holes Hb is formed passing through the side wall of the projecting part 132b in the radial direction. The vent hole P communicates with the interior of the liquid tank 101 via these holes Hb in the side wall, and the through-hole Ha.

According to the present embodiment, in addition to the effects of preventing the urea precipitation achieved by forming the inner surface of the vent hole P from a resin, in particular the following effects can be achieved. That is to say, according to the present embodiment, when the liquid tank 101 itself is subjected to a considerable shaking or the stored urea aqueous solution splashes and collides with the movable body 137, the movable body 137 moves upward (the position after moving is shown by the two-dot chain line 137') to thereby close the vent hole P. Therefore, ingress of the urea aqueous solution to the inside of the vent hole P can be prevented. The ventilation performance of the breather device A2 in the normal state is ensured by the holes Hb formed in the side wall. In FIG. 7, flow of gas introduced in the normal state is shown by the arrows F.

Figure 8:
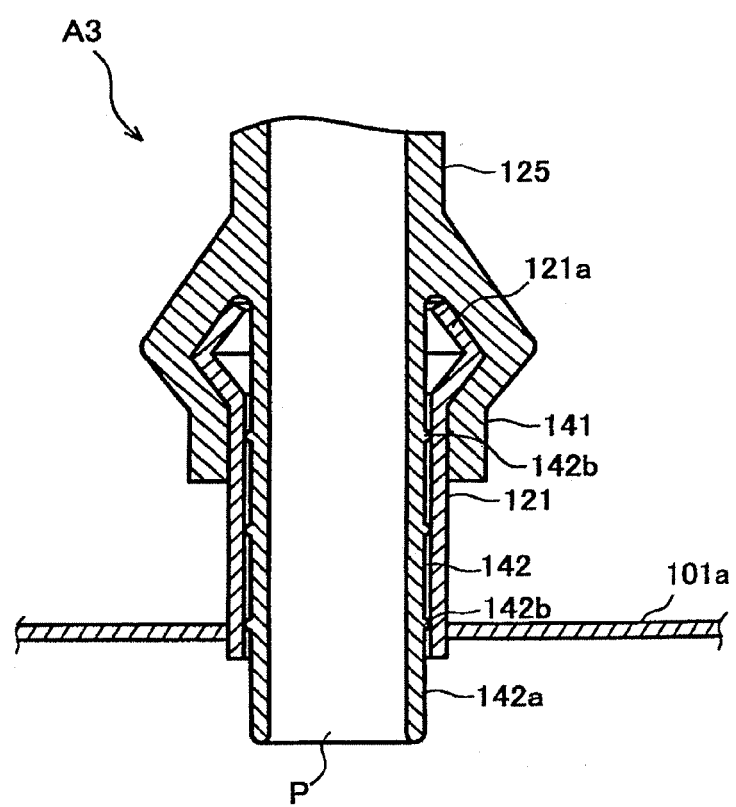
FIG. 8 is a cross-sectional view illustrating a configuration of a breather device according to a third embodiment of the present invention.

FIG. 8 is a sectional view showing a configuration of a breather device A3 according to a third embodiment of the present invention.

The breather device A3 according to the present embodiment corresponds to that of the first embodiment in that the "fixing part" is made from a stainless steel cylindrical pipe (that is, a breather pipe) 121, and in that the breather pipe 121 provides a certain extent of fixation strength with respect to the liquid tank 101. However, it is characterized in that the "communication part" that forms the inner surface of the vent hole P is formed as one part 142 of the breather hose 125 connected to the breather pipe 121. That is to say, in the present embodiment: the breather hose 125 is connected so as to cover the bulging part 121a of the breather pipe 121; and in this connection part, the breather hose 125 is formed in a double cylinder shape with an outer cylinder part 141 and an inner cylinder part 142; and the breather hose 125 is connected to the breather pipe 121 by means of the outer cylinder part 141, thereby ensuring air tightness of the breather device A3. On the other hand, the inner cylinder part 142 has an outer diameter that is slightly smaller than the inner diameter of the breather pipe 121, and is set with a length so that a tip end 142a just projects from the breather pipe 121. On the outer periphery of the inner cylinder part 142, there is formed a plurality of protruding parts 142b spaced apart in the axial direction, to thereby stabilize the state of the inner cylinder part 142 within the breather pipe 121. The breather hose 125 is made of rubber, and in this sense, the "resin" in the present invention includes rubber.

According to the present embodiment, since the inner surface of the vent hole P is formed by the inner cylinder part 142, as one portion of the breather hose 125, there is an advantage of obtaining an effect of urea precipitation prevention, and an effect of improvement in the fixation strength of the breather hose 125 to the breather pipe 121 at the same time, while reducing the number of components.

In the foregoing description, only selected embodiments have been chosen to illustrate the present invention. However, the scope of the present invention is not limited by this description, but is to be interpreted based on the appended claims in accordance with to applied articles.

We claim:

1. A breather device configured to be disposed in a liquid tank for storing urea aqueous solution, comprising:
   a fixing part configured to provide the breather device with fixation strength enough for securing the breather device to the liquid tank, wherein the fixing part is formed by joining a plate of stainless steel material into a cylindrical shape with a hollow extending therethrough in an axial direction; and
   a breather tube comprising a communication part joined to the fixing part, the communication part configured to form therein a vent hole for providing fluid communication between an interior of the liquid tank and an outside thereof,
   wherein in the communication part, an inner surface of the vent hole is formed from a resin,
   wherein the breather tube is attached to one end of an outside of the liquid tank to form therein a gas-flow passage communicatable with the vent hole, and
   wherein the communication part permits one end of the breather tube to be formed to extend into the inside of the fixing part.

2. The breather device according to claim 1, wherein the communication part protrudes further beyond an end face of the fixing part on a side in the vicinity of an interior of the liquid tank into the interior.

3. The liquid tank comprising:
   a tank main body configured to store therein a liquid; and
   the breather device according to claim 1, which is attached to the tank main body.

4. An exhaust gas purifying apparatus for an engine comprising:
   a reducing catalytic converter provided in an exhaust gas passage of the engine;
   the liquid tank according to claim 3, which is configured to be appropriate for storing ammonia or its precursor in an aqueous solution state; and
   an addition device configured to add the ammonia solution or precursor solution stored in the liquid tank to an exhaust gas at a position upstream of the reducing catalytic converter.

* * * * *